(12) United States Patent
Kühneweg et al.

(10) Patent No.: US 11,701,861 B2
(45) Date of Patent: Jul. 18, 2023

(54) ANTI-ICING STACK

(71) Applicant: 3M INNOVATIVE PROPERTIES COMPANY, St. Paul, MN (US)

(72) Inventors: Bernd Kühneweg, Duesseldorf (DE); Frans A. Audenaert, Kaprijke (BE); Michael Juergens, Kastl (DE); Christoph T. R. Schuell, Neuss (DE); Andrea Habbe, Moers (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/663,959

(22) Filed: May 18, 2022

(65) Prior Publication Data
US 2022/0274374 A1 Sep. 1, 2022

Related U.S. Application Data

(63) Continuation of application No. 17/045,674, filed as application No. PCT/IB2019/053201 on Apr. 17, 2019, now abandoned.

(30) Foreign Application Priority Data

Apr. 26, 2018 (EP) .................................... 18169506

(51) Int. Cl.
  *B32B 5/18* (2006.01)
  *F03D 80/40* (2016.01)
  (Continued)

(52) U.S. Cl.
  CPC .................. *B32B 5/18* (2013.01); *B32B 7/12* (2013.01); *B32B 27/065* (2013.01); *B32B 27/08* (2013.01);
  (Continued)

(58) Field of Classification Search
  CPC .......... B32B 2266/14; B32B 2305/022; B32B 2307/54; B32B 2307/712;
  (Continued)

(56) References Cited

U.S. PATENT DOCUMENTS 5,187,015 A  2/1993  Yorkgidis
2007/0254170 A1  11/2007  Hoover
(Continued)

FOREIGN PATENT DOCUMENTS

JP  2004018604  1/2004
WO  2013019524  2/2013
(Continued)

OTHER PUBLICATIONS

U.S. Appl. No. 97/189,922, filed Aug. 1, 2017, Traser et al.
(Continued)

*Primary Examiner* — Hai Vo
(74) *Attorney, Agent, or Firm* — George H. Rosenblatt

(57) ABSTRACT

Anti-icing stacks for protecting an aerodynamic surface are described. In some embodiments, an anti-icing stack includes an anti-icing layer, an elastomeric erosion protection layer, and an additional layer. The erosion protection layer is disposed between the anti-icing layer and the additional layer. The additional layer has a thickness greater than the thickness of the erosion protection layer and a tensile modulus of no more than the tensile modulus of the erosion protection layer. The additional layer may be a foam adhesive layer.

3 Claims, 2 Drawing Sheets

(51) Int. Cl.

| | | |
|---|---|---|
| *B32B 7/12* | (2006.01) | |
| *B32B 27/06* | (2006.01) | |
| *B32B 27/08* | (2006.01) | |
| *B32B 27/18* | (2006.01) | |
| *B32B 27/28* | (2006.01) | |
| *B32B 27/40* | (2006.01) | |
| *B64C 11/20* | (2006.01) | |
| *B64C 27/473* | (2006.01) | |
| *B64D 15/00* | (2006.01) | |
| *F03D 1/06* | (2006.01) | |

(52) U.S. Cl.
CPC ............ *B32B 27/18* (2013.01); *B32B 27/283* (2013.01); *B32B 27/40* (2013.01); *B64C 11/205* (2013.01); *B64C 27/473* (2013.01); *B64D 15/00* (2013.01); *F03D 1/0675* (2013.01); *F03D 80/40* (2016.05); *B32B 2266/14* (2016.11); *B32B 2305/022* (2013.01); *B32B 2307/54* (2013.01); *B32B 2307/712* (2013.01); *B32B 2307/732* (2013.01); *B32B 2375/00* (2013.01); *B32B 2383/00* (2013.01); *B32B 2603/00* (2013.01); *B64C 2027/4736* (2013.01); *F05B 2280/6011* (2013.01)

(58) Field of Classification Search
CPC .......... B32B 2307/732; B32B 2375/00; B32B 2383/00; B32B 2603/00; B32B 27/065; B32B 27/08; B32B 27/18; B32B 27/283; B32B 27/40; B32B 5/18; B32B 7/12; B64C 11/205; B64C 2027/4736; B64C 27/473; B64D 15/00; C09J 2301/414; C09J 2400/24; C09J 2433/006; C09J 2475/006; C09J 2483/006; C09J 7/22; C09J 7/29; C09J 7/30; F03D 1/0675; F03D 80/40; F05B 2280/6011; Y02E 10/72
See application file for complete search history.

(56) References Cited

U.S. PATENT DOCUMENTS

2009/0294724 A1 12/2009 Attar
2011/0142678 A1 6/2011 Santiago
2015/0166831 A1 6/2015 Kuehneweg

FOREIGN PATENT DOCUMENTS

WO 2017189215 11/2017
WO 2017189475 11/2017

OTHER PUBLICATIONS

1507 Extended EP Search Report for EP118169506.5, dated Jan. 29, 2019, 8pgs.
3M Aerospace Surface Protection, Product Brochure, 3M Company, 2016, 12 pp.
International Search Report for PCT International Application No. PCT/IB2019/053201, dated Oct. 31, 2019, 6 pages.
IPRP for PCT International Application No. PCT/IB2019/053201, dated Mar. 25 2020, 13 pages.
Kreder, "Design of anti-icing surfaces: smooth, textured or slippery?", Nature Review Materials, Jan. 2016, vol. 1, No. 1, 36 pages.
Machine Translation—JP2004-018604A, Sato et al., Jan. 22, 2004.
Makkonen, "Ice Adhesion—Theory, Measurements and Countermeasures", Journal of Adhesion Science and Technology, 2012, vol. 26, No. 4-5, pp. 413-445.
Meuler, "Relationships between Water Wettability and Ice Adhesion", ACS Applied Materials & Interfaces, 2010, vol. 2, No. 11, pp. 3100-3110.
Parent, "Anti-icing and de-icing techniques for wind turbines: Critical review", Cold Regions Science and Technology, 2011, vol. 65, No. 1, pp. 88-96.
Technical Data Sheet: "3M™ Aircraft Belly Protective Tape 8641", A product of 3M, Mar. 2007, 4 pages.
Technical Data Sheet: "3M™ Wind Blade Protection Coating W4600 Technical Data Sheet and Application Guide", A product of 3M, 2014, 4 pages.
Technical Data Sheet: "3M™ Wind Blade Protection Tape 8607 7R 9800767", A product of 3M, 2016, 2 pages.
Yorkgitis, "Glaciphobic Polymeric Materials", Journal of Adhesion Science and Technology, 2012, vol. 26, No. 4-5, pp. 681-699.

ANTI-ICING STACK

CROSS REFERENCE TO RELATED APPLICATIONS

This application is a continuation of U.S. application Ser. No. 17/045,674, filed Oct. 6, 2020, now pending, which is a national stage filing under 35 U.S.C. 371 of PCT/IB2019/053201, filed Apr. 17, 2019, which claims priority to EP Application No. 18169506.5, filed Apr. 26, 2018, the disclosure of which is incorporated by reference in its/their entirety herein.

BACKGROUND

The formation and accretion of ice on rotor blades, e. g. rotor blades of wind turbines or helicopters, can hinder their performance. Furthermore, rotor blades are subject to erosion caused by the impact of airborne material, such as rain, sand, and dust.

SUMMARY

In some aspects of the present description, an aerodynamic surface including an edge portion and an anti-icing stack disposed on the edge portion is provided. The anti-icing stack includes a first layer and a foam adhesive layer bonding the first layer to the edge portion of the aerodynamic surface. The first layer is at least one of an erosion protection layer having an elongation at break of greater than 100% or an anti-icing layer. The foam adhesive layer has a tensile modulus of less than 5 MPa and a thickness of at least 300 micrometers.

In some aspects of the present description, an anti-icing stack including an anti-icing layer, an elastomeric erosion protection layer, and an additional layer is provided. The erosion protection layer is disposed between the anti-icing layer and the additional layer. The additional layer has a thickness greater than a thickness of the erosion protection layer and a tensile modulus of no more than a tensile modulus the erosion protection layer.

In some aspects of the present description, a method of reducing an ice adhesion of an erosion protection layer for an aerodynamic surface is provided. The method includes disposing a first intermediate layer between the erosion protection layer and the aerodynamic surface, where the first intermediate layer has a thickness greater than a thickness of the erosion protection layer and a tensile modulus of no more than a tensile modulus of the erosion protection layer.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Figure 1A:
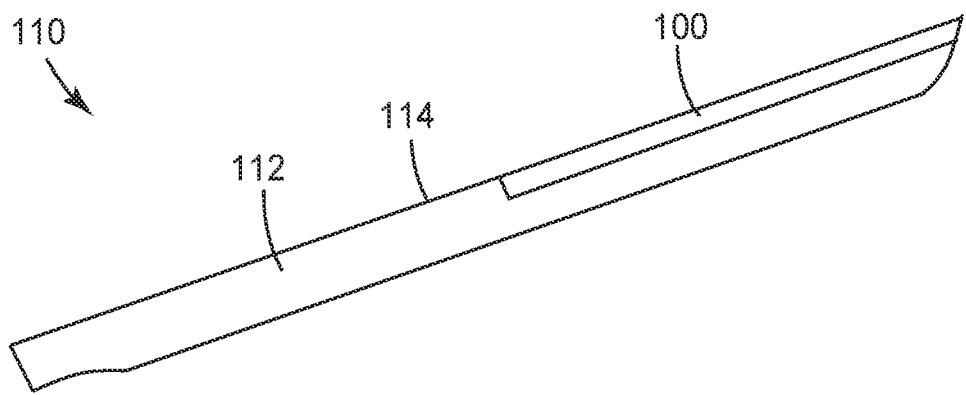
FIG. 1A is a schematic top view of a wind turbine blade.
Figure 1B:
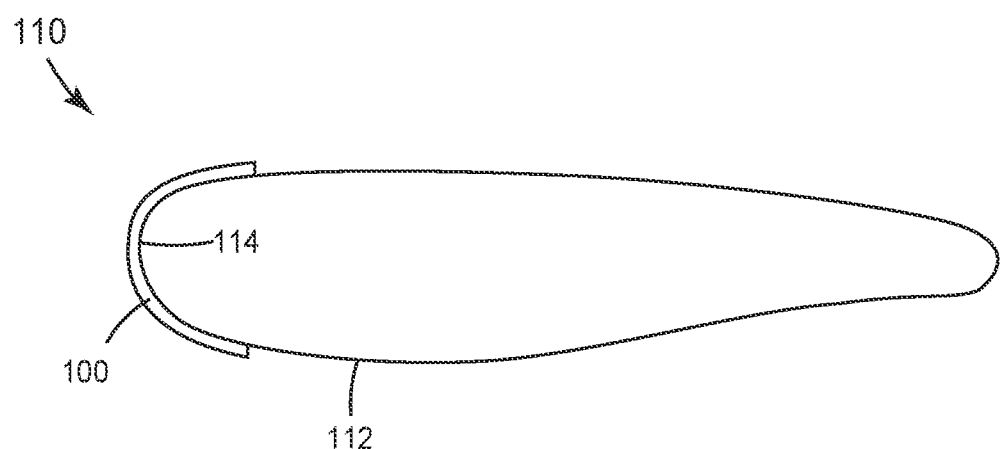
FIG. 1B is a schematic cross-sectional view of the wind turbine blade of FIG. 1A.

FIGS. 1A-1B are schematic top and cross-sectional views of a wind turbine blade 110 having an aerodynamic surface 112 including an edge portion 114. An anti-icing stack 100 is disposed on the edge portion 114. The anti-icing stack 100 may be disposed on all or only a portion of the length of the edge portion 114. The cross-section of FIG. 1B is along a portion of the length of the wind turbine blade where the anti-icing stack 100 is included. The anti-icing stack 100 is preferably configured to protect the aerodynamic surface 112 from ice buildup and may also protect the aerodynamic surface 112 from erosion (e. g., caused by the impact of rain). The anti-icing stack 100 includes at least two layers (not shown in FIGS. 1A-1B) as described further elsewhere herein. It has been found that using a sufficiently thick and sufficiently soft layer between an erosion protection layer and an aerodynamic surface reduces ice adhesion to the erosion protection layer. Accordingly, an anti-icing stack which includes an erosion protection layer and a soft layer adapted to be placed between the erosion protection layer and the aerodynamic surface has an anti-icing property even when the anti-icing stack does not include a separate anti-icing layer according to some embodiments of the present description. In some embodiments, an anti-icing stack includes an anti-icing layer disposed on the erosion protection layer to further improve the ice release properties of the anti-icing stack. In other embodiments, a separate erosion protection layer is omitted and an anti-icing layer is disposed on the soft layer. In this case, the soft layer can improve the ice release properties of the anti-icing layer compared to the anti-icing layer without the soft layer.

In some embodiments, a method of reducing the ice adhesion of an erosion protection layer (e. g., a thermoplastic polyurethane) for an aerodynamic surface includes disposing a sufficiently thick (e. g., thicker than the erosion protection layer) and sufficiently soft (e. g., having a tensile modulus of no more than a tensile modulus of the erosion protection layer) intermediate layer between the erosion protection layer and the the aerodynamic surface. In some embodiments, the intermediate layer and the erosion protection layer are disposed on an edge portion of the aerodynamic surface. In some embodiments, the intermediate layer sufficiently reduces the ice adhesion to the erosion protection layer that no additional anti-icing layer is needed. In other embodiments, the method further includes disposing an anti-icing layer on the erosion protection layer to further reduce the ice adhesion.

In wind-turbine applications, it is typically preferred that the anti-icing stacks be applied to the leading edge of the rotor blade since this edge is prone to ice build-up and erosion. However, the anti-icing stacks of the present description can also be applied to other portions of the rotor blade, or to other types of rotor blades, or to other aerodynamic surfaces, or to other types of surfaces. In some embodiments, the anti-icing stacks are applied to a rotor blade (e. g., a leading edge of the rotor blade of a wind turbine) used in a helicopter, for example, or the leading edge of an aircraft wing, for example. Other surfaces where the anti-icing stacks can be applied include those in air conditioners, antennas, high-voltage power lines, overhead transmission lines, and satellite dishes.

Figure 2:
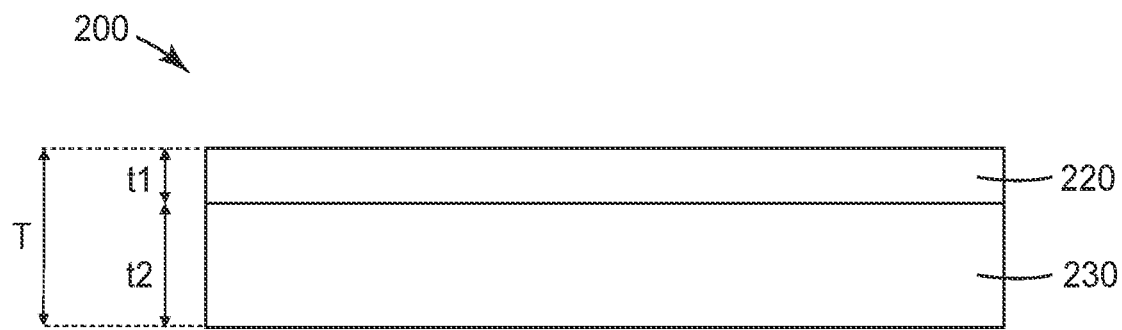
FIGS. 2-4 are a schematic side views of anti-icing stacks.

FIG. 2 is a schematic side view of an anti-icing stack 200 which includes a first layer 220 and an additional layer 230. The first layer 220 may be at least one of an erosion protection layer having an elongation at break of greater than 100% (or greater than 200%, or greater than 300%, or greater than 500%, or greater than 600%, or in a range of 200% to 3000%) or an anti-icing layer (e. g., the first layer 220 may be an erosion protection layer, or the first layer 220 may be an anti-icing layer, or the first layer 220 may be both an erosion protection layer and an anti-icing layer). The additional layer 230 is preferably soft (e. g., having a low tensile modulus) and thick (e. g., thicker than the first layer 220). In some embodiments, the additional layer 230 has a tensile modulus of no more than a tensile modulus of the first layer 220, or no more than 0.8 times the tensile modulus of the first layer 220, or no more than 0.6 times the tensile modulus of the first layer 220, or no more than 0.5 times the tensile modulus of the first layer 220. In some embodiments, the additional layer 230 has a tensile modulus of less than 5 MPa, or less than 3 MPa, or less than 1 MPa. In some embodiments, the additional layer 230 has a tensile modulus in a range of 100 kPa to 3 MPa, for example. In some embodiments, first layer 220 is both an erosion protection layer and an anti-icing layer. In some embodiments, first layer 220 is an anti-icing layer. In some embodiments, first layer 220 is an erosion protection layer having an ice release property due, at least in part, to properties of the additional layer 230 (e. g., tensile modulus and thickness). The first layer 220 has a thickness of t1 and the additional layer 230 has a thickness of t2. In some embodiments, t2 is greater than t1, or greater than 1.5 times t1, or greater than 2 times t1, or greater than 3 times t1, or greater than 4 times t1. In some embodiments, t2 is at least 50% of a total thickness T of the anti-icing stack 200. In some embodiments, t2 is at least 300 micrometers, or at least 500 micrometers, or at least 600 micrometers, or at least 800 micrometers, or at least 1000 micrometers, or at least 1100 micrometers. In some embodiments, t2 is in a range of 300 micrometers to 2 mm, for example.

The anti-icing stack 200 is preferably configured such that when it is disposed on an aerodynamic surface (e. g., as illustrated in FIGS. 1A-1B), the additional layer 230 faces the aerodynamic surface and the first layer 220 faces away from the aerodynamic surface. Since the additional layer 230 is disposed between the first layer 220 and the aerodynamic surface, it may also be referred to as an intermediate layer. In some embodiments, the additional layer 230 is an adhesive layer which may be a foam adhesive layer. Polymeric foam layers, for example, have been found to provide the softness and thickness needed to improve the anti-icing properties of the first layer 220. In some embodiments, the additional layer 230 is a foam layer which is not an adhesive. In this case, an adhesive layer (e. g., a pressure-sensitive adhesive (PSA) layer) may be disposed between the additional layer 230 and the aerodynamic surface. In some embodiments, the additional layer 230 is not a foam. For example, the additional layer 230 may be a soft elastomer (e. g., having a tensile modulus of less than 5 MPa or less than 3 MPa or less than 1 MPa).

Tensile modulus refers to Young's modulus unless indicated differently. The tensile modulus and the elongation at break can be determined as described in the ASTM test standard D882-12 "Standard Test Method of Tensile Properties of Thin Plastic Sheeting". The ASTM D882-12 standard utilizes an extensometer to grip a film sample of the material to be tested at opposite ends of the sample, apply a load to the sample, and determine the load verses extension (distance between grips). The tensile modulus and elongation at break are determined from the resulting load-extension curve. The anti-icing stacks of the present description may also be characterized in terms of a flexural modulus. The flexural modulus may be determined as described in ASTM test standard D790-17 "Standard Test Methods for Flexural Properties of Unreinforced and Reinforced Plastics and Electrical Insulating Materials". The ASTM D790-17 standard utilizes a three-point loading system and determines the applied load versus the deflection at a midway point between supports. The flexural modulus is determined from the resulting load-deflection curve.

In some embodiments, the anti-icing stack 200 includes a second layer disposed on the first layer 220 opposite the additional layer 230. In some embodiments, the first layer 220 is an erosion protection layer and the second layer is an anti-icing layer.

Figure 3:
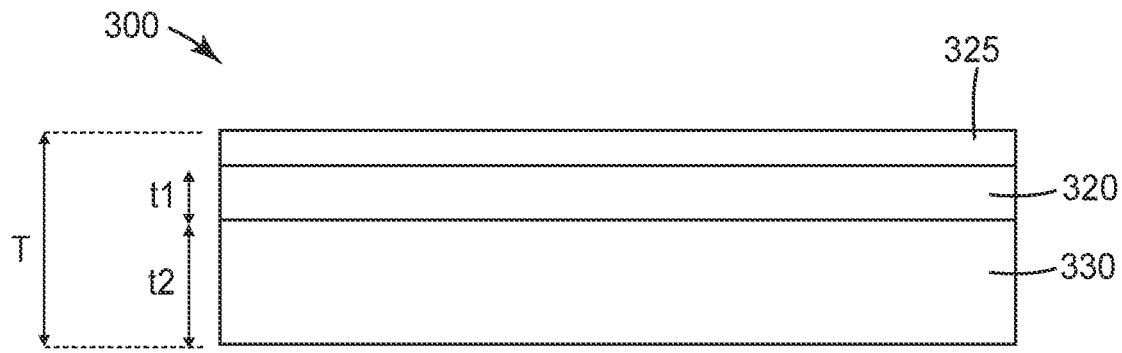

FIG. 3 is a schematic side view of an anti-icing stack 300 which includes an elastomeric erosion protection layer 320, an anti-icing layer 325, and an additional layer 330. The erosion protection layer 320 is disposed between the anti-icing layer 325 and the additional layer 330. The additional layer 330 is preferably sufficiently soft and thick that it results in improved anti-icing properties of the anti-icing stack 300. The additional layer 330 may be as described for additional layer 230. For example, the additional layer 330 may be a foam adhesive layer. The erosion protection layer 320 may be as described for embodiments of first layer 220 where there first layer 220 is an erosion protection layer. For example, the erosion protection layer 320 may have an elongation at break of greater than 100%. The thickness t1 of the erosion protection layer 320, the thickness t2 of the additional layer 330 and the total thickness T of the anti-icing stack 300 may be as described for the anti-icing stack 200. For example, t2 may be greater than t1, or greater than 2 times t1, or at least 300 micrometers, or at least 600 micrometers, or at least 50% of T.

Figure 4:
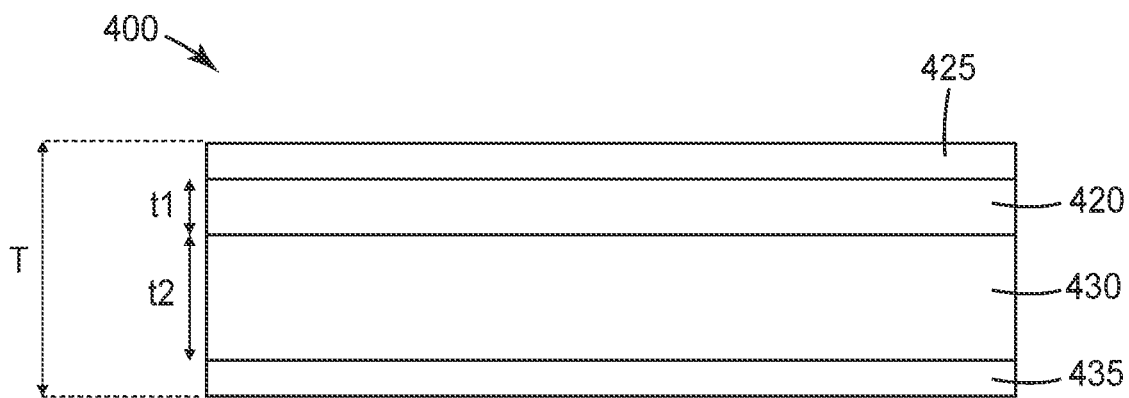

FIG. 4 is a schematic side view of an anti-icing stack 400 which includes an elastomeric erosion protection layer 420, an anti-icing layer 425, a first intermediate layer 430 and a second intermediate layer 435. The erosion protection layer 420 is disposed between the anti-icing layer 425 and the first intermediate layer 430. The first intermediate layer 430, which is preferably sufficiently soft and thick that it results in improved anti-icing properties of the anti-icing stack 400, may be as described for additional layer 230 or additional layer 330. The anti-icing layer 425 may be as described for anti-icing layer 325 or as described for embodiments of first layer 220 where the first layer 220 is an anti-icing layer. The erosion protection layer 420 may be as described for erosion protection layer 320 or as described for embodiments of first layer 220 where the first layer 220 is an erosion protection layer. The second intermediate layer 435 may be an adhesive layer for attaching the anti-icing stack to an aerodynamic surface. An additional adhesive layer (not illustrated) may be disposed between the erosion protection layer 420 and the first intermediate layer 430. For example, a tape including the erosion protection layer 420 and an adhesive layer may be adhered to the first intermediate layer 430, which may be a non-adhesive foam, for example. An additional adhesive layer may similarly be included between first layer 220 and additional layer 230 or between elastomeric erosion protection layer 320 and additional layer 330. In preferred embodiments, the first intermediate layer 430 is a foam layer and the second intermediate layer 435 is an adhesive layer. The thickness t1 of the erosion protection layer 420, the thickness t2 of the first intermediate layer 430 and the total thickness T of the anti-icing stack 400 may be as described for the anti-icing stack 200 or for anti-icing stack 400.

In some embodiments, additional layer(s) not shown in FIGS. 2-4 are included. For example, additional adhesive layers can be included as described above. In some embodiments, additional non-adhesive layer(s) are included. For example, is some embodiments, the first layer 220, the elastomeric erosion protection layer 320, or the elastomeric erosion protection layer 420 is applied to a substrate (e. g., coated onto the substrate) which is then adhered to the additional layer 230, the additional layer 330, or the first intermediate layer 430, respectively. If such a substrate is included, it is preferred that the substrate be sufficiently thin and flexible (e. g., a polymeric substrate having a thickness of no more than about 125 micrometers) that the protective or anti-icing stack remains flexible so that the additional layer 230, the additional layer 330, or the first intermediate layer 430 is effective in improving the ice release properties of the respective anti-icing stack. In some embodiments, the anti-icing stack 200, or the anti-icing stack 300, or the anti-icing stack 400 has a flexural modulus of less than 10 MPa. In some embodiments, the flexural modulus is less than 5 MPa, or less than 3 MPA, or less than 1 MPa. In some embodiments, the flexural modulus is in a range of 100 kPa to 3 MPA.

Suitable adhesives (e. g., foam adhesives) that can be used as additional layer 230 or additional layer 330, for example, include pressure-sensitive adhesives (e. g. acrylic, rubber (e. g., isoprene based rubbers or styrene-butadiene based rubbers), and silicone based adhesives) and structural adhesives (e. g. epoxy, urethane, and acrylic based adhesives). The adhesive can be provided in a tape. Suitable foam tapes include 3M VHB 4433, 3M VHB 4611, 3M VHB 5952, 3M VHB GPH-060GF, 3M VHB GPH-110GF, and 3M VHB GPH-160GF acrylic foam tapes available from 3M Company (St. Paul, Minn., USA). These types of adhesives can also be used for first intermediate layer 430 and/or second intermediate layer 435. In some embodiments, first intermediate layer 430 is not an adhesive. For example, non-adhesive foams may be used for first intermediate layer 430 when the second intermediate layer 435 is an adhesive layer.

It is preferred that the foam layer, or other type of additional or intermediate layer, have a thickness greater than a thickness of the erosion protection layer. In some embodiments, a foam adhesive layer, or other type of additional or intermediate layer, has a thickness of at least 300 micrometers, or of at least 500 micrometers, or at least 600 micrometers, or of at least 800 micrometers, or of at least 1000 micrometers, or at least 1100 micrometers. In some embodiments, a foam adhesive layer, or other type of additional or intermediate layer, has a thickness of at least 300 micrometers, or of at least 500 micrometers, or at least 600 micrometers, or of at least 800 micrometers, or of at least 1000 micrometers, or at least 1100 micrometers and no more than 3 mm, or no more than 2 mm, or no more than 1.8 mm. In some embodiments, a foam adhesive layer, or other type of additional or intermediate layer, has a thickness greater than a thickness of the erosion protection layer, or greater than 1.5 times a thickness of the erosion protection layer, or greater than twice a thickness of the erosion protection layer, or greater than 3 times a thickness of the erosion protection layer, or greater than 4 times a thickness of the erosion protection layer. It is preferred that the foam layer, or other type of additional or intermediate layer, have a tensile modulus less than 5 MPa, or less than 3 MPa, or less than 1 MPa. It is preferred that the foam layer, or other type of additional or intermediate layer, have a tensile modulus of no more than the tensile modulus of the erosion protection layer, or no more than 0.8 times the tensile modulus of the erosion protection layer, or no more than 0.6 times the tensile modulus of the erosion protection layer, or no more than 0.5 times the tensile modulus of the erosion protection layer.

The additional layer 230 or additional layer 330 or first intermediate layer 430 may or may not be uniform layers having no distinct sublayers. In some embodiments, the additional layer 230 or additional layer 330 or first intermediate layer 430 includes sublayers. For example, a tape including adhesive foams on opposing sides of a carrier substrate may be used for any of these layers. In this case, the tape may be considered to be a layer having three sublayers—the carrier substrate and the two opposing adhesive foam layers.

Suitable materials for the erosion protection layer (e. g., first layer 220 in embodiments where this layer is an erosion protection layer, erosion protection layer 320, or erosion protection layer 420) include elastomers such as polyurethane-based elastomers and silicone-based elastomers. Example materials include 3M Wind Blade Protection Coating W4600 available from 3M Company, St. Paul, Minn., USA. It is preferred that the erosion protection layer be an elastomer having a large elongation at break. In some embodiments, the erosion protection layer has an elongation at break of greater than 100%, or greater than 200%, or greater than 300%, or greater than 500%, or greater than 600%. In some embodiments, the erosion protection layer, has an elongation at break in a range of 200% to 3000%. In some embodiments, the foam layer, or other type of additional or intermediate layer, also has an elongation at break in any of these ranges (e. g., greater than 100% or in a range of 200% to 3000%). 3M Wind Blade Protection Coating W4600 has an elongation at break above 600%. Other useful erosion protection materials include 3M Wind Blade Protection Coating W4601, 3M Wind Blade Protection Tape W8607, and 3M Wind Blade Protection Tape W8750 all available from 3M Company, St. Paul, Minn., USA, and all having an elongation at break above 600%. In embodiments where a tape is used, the adhesive layer of the tape is preferably disposed between the erosion protection layer and the foam layer, or other type of additional or intermediate layer.

Suitable materials for the anti-icing layer (e. g., first layer 220 in embodiments where this layer is an anti-icing layer, anti-icing layer 325, or anti-icing layer 425) includes polymers comprising polydimethyl siloxane segments. Suitable anti-icing layers including siloxane materials are described, for example, in PCT Publ. No. WO 2017/189475 (Meuler et al.). In some embodiments, an anti-icing layer includes fluorochemical materials. Suitable anti-icing layers including fluorochemical materials are described, for example, in PCT Publ. No. WO 2017/189215 (Elsbernd et al.).

In some embodiments, an anti-icing layer is formed from a polysiloxane acrylate copolymer. Suitable polysiloxane acrylate copolymers can be obtained as a reaction product (free radical polymerization) of a polysiloxane macromonomer and an acrylate comonomer in an organic solvent with an initiator. Suitable polysiloxane macromonomers include those available from Shin-Etsu Chemical Co., Ltd. (Tokyo, Japan) such as X-22-2426 and KF-2012. Polysiloxane macromonomers having a molecular weight of at least 4000 g/mole are preferred as such macromonomers have been found to result in improved anti-icing properties compared to using lower molecular weight macromonomers. Suitable acrylate comonomers include lauryl methacrylate (LMA), butyl acrylate (BA), 2 ethyl hexyl methacrylate (2-ERMA), butyl methacrylate (BMA), isobutyl methacrylate (iBMA), and methyl methacrylate (MMA). BMA is preferred as this has been found to result in improved anti-icing properties compared to using other acrylate comonomers. Suitable organic solvents include tert-butanol (t-BuOH). Suitable initiators include 2,2'-azobis(2-methylbutyronitrile) initiator which is available from Wako Pure Chemical Industries, Ltd. (Japan) under the tradename V-59. The polymerization results in a polysiloxane acrylate copolymer having an acrylate copolymer backbone with polysiloxane side chains. The solution containing the polysiloxane acrylate copolymer, which may be referred to as an anti-icing coating composition, can be coated and then dried to remove the organic solvent resulting in an anti-icing layer formed from the polysiloxane acrylate copolymer.

In some embodiments, an anti-icing layer is formed by coating and drying a coating composition. In some embodiments, the coating composition includes a polyurethane dispersion, an organic thickener, a film-forming additive, and an ice-release additive which is an additive for improving the ice-release properties of the resulting anti-icing layer. Suitable polyurethane dispersions include aliphatic polyurethane dispersions such as NEOREZ R-2005 available from DSM Resins, Inc. (Augusta, Ga., USA). Suitable organic thickeners include Xanthan and nonionic urethane rheology modifiers such as ACRYSOL RM-8W available from Dow Chemical Company (Midland, Mich., USA). Suitable film-forming additives include coalescing solvents such as ether-alcohols. Useful ether alcohols include propylene glycol n-butyl ether (e. g., PnB available from Dow Chemical Company), dipropylene glycol monomethyl ether (e. g., DPM available from Dow Chemical Company), dipropylene glycol n-butyl ether (e. g., DPnB available from Dow Chemical Company), tripropylene glycol monomethyl ether (e. g., TMP from Lyondell Basell Industries, Houston, Tex., USA). Suitable ice-release additives include additives comprising at least one of a silicon containing additive or a fluorine containing additive. Suitable silicon containing additives include additives comprising a polydimethyl siloxane moiety. Suitable fluorine containing additives include additives comprising at least one of a fluorinated alkyl moiety or a perfluoroether moiety. The ice-release additive may be a surfactant and/or may be an amphiphilic additive. An amphiphilic additive includes low surface energy segments (e. g., a polydimethyl siloxane moiety or a fluorinated alkyl moiety or a perfluoroether moiety) and high surface energy segments (e. g., a polyoxyethylene moiety, or an acid or acid-salt moiety). Amphiphilic additives are preferred so that the additive dissolves or disperses in the aqueous polyurethane dispersion and provides a low surface energy to improve the ice release of the resulting anti-icing layer. Suitable amphiphilic additives include polyether-modified polydimethylsiloxane (e. g., BYK-333 available from BYK-Chemie GmbH, Germany) and polyether-modified fluorinated acrylate polymers (e. g., FC-4430 and FC-4432 available from 3M Company, St. Paul, Minn., USA).

The following is a list of illustrative embodiments of the present description.

Embodiment 1 is an aerodynamic surface comprising an edge portion and an anti-icing stack disposed on the edge portion, wherein the anti-icing stack comprises:
a first layer being at least one of an erosion protection layer having an elongation at break of greater than 100% or an anti-icing layer; and
a foam adhesive layer having a tensile modulus of less than 5 MPa, the foam adhesive layer bonding the first layer to the edge portion of the aerodynamic surface, the foam adhesive layer having a thickness of at least 300 micrometers.

Embodiment 2 is the aerodynamic surface of Embodiment 1, wherein the elongation at break and the tensile modulus are as determined according to ASTM test standard D882-12.

Embodiment 3 is the aerodynamic surface of Embodiment 1 or 2, wherein the elongation at break of the erosion protection layer is greater than 200%.

Embodiment 4 is the aerodynamic surface of any one of Embodiments 1 to 3, wherein the elongation at break of the erosion protection layer is greater than 300%.

Embodiment 5 is the aerodynamic surface any one of Embodiments 1 to 4, wherein the elongation at break of the erosion protection layer is greater than 500%.

Embodiment 6 is the aerodynamic surface of any one of Embodiments 1 to 5, wherein the elongation at break of the erosion protection layer is in a range from 200% to 3000%.

Embodiment 7 is the aerodynamic surface of any one of Embodiments 1 to 6, wherein the thickness of the foam adhesive layer is at least 50% of a total thickness of the anti-icing stack.

Embodiment 8 is the aerodynamic surface of any one of Embodiments 1 to 7, wherein the first layer is the erosion protection layer.

Embodiment 9 is the aerodynamic surface of Embodiment 8, wherein the anti-icing stack further comprises a second layer disposed on the first layer opposite the foam adhesive layer, the second layer being an anti-icing layer.

Embodiment 10 is the aerodynamic surface of Embodiment 9, wherein the first layer is a polyurethane-based elastomer, and the second layer comprises: polyurethane, an organic thickener, and an ice-release additive.

Embodiment 11 is the aerodynamic surface of Embodiment 10, wherein the ice-release additive comprises at least one of a silicon containing additive or a fluorine containing additive.

Embodiment 12 is the aerodynamic surface of Embodiment 11, wherein the ice-release additive comprises the silicon containing additive, the silicon containing additive comprising a polydimethyl siloxane moiety.

Embodiment 13 is the aerodynamic surface of Embodiment 11, wherein the ice-release additive comprises the fluorine containing additive, the fluorine containing additive comprising at least one of a fluorinated alkyl moiety or a perfluoroether moiety.

Embodiment 14 is the aerodynamic surface of any one of Embodiments 10 to 13, wherein the ice-release additive comprises a surfactant.

Embodiment 15 is the aerodynamic surface of any one of Embodiments 10 to 14, wherein the ice-release additive comprises an amphiphilic additive.

Embodiment 16 is the aerodynamic surface of Embodiment 9, wherein the anti-icing layer comprises a polysiloxane acrylate copolymer.

Embodiment 17 is the aerodynamic surface of Embodiment 9, wherein the first layer is a polyurethane-based elastomer, and the second layer comprises either a polysiloxane acrylate copolymer or a polyurethane, an organic thickener, and an ice-release additive.

Embodiment 18 is the aerodynamic surface of Embodiment 9, wherein the first layer is a polyurethane-based elastomer, and the second layer comprises a polymer comprising polydimethyl siloxane segments.

Embodiment 19 is the aerodynamic surface of any one of Embodiments 9 to 18, wherein the anti-icing stack has a flexural modulus of less than 10 MPa.

Embodiment 20 is the aerodynamic surface of Embodiment 19, wherein the flexural modulus is as determined according to ASTM test standard D790-17.

Embodiment 21 is the aerodynamic surface of any one of Embodiments 1 to 20, wherein the thickness of the foam adhesive layer is at least 600 micrometers.

Embodiment 22 is an anti-icing stack comprising:
an anti-icing layer;
an elastomeric erosion protection layer; and
an additional layer,
wherein the erosion protection layer is disposed between the anti-icing layer and the additional layer,
wherein the additional layer has a thickness greater than a thickness of the erosion protection layer and a tensile modulus of no more than a tensile modulus of the erosion protection layer.

Embodiment 23 is the aerodynamic surface of Embodiment 22, wherein the tensile modulus of the erosion protection layer and the tensile modulus of the additional layer are as determined according to ASTM test standard D882-12.

Embodiment 24 is the anti-icing stack of Embodiment 22 or 23, wherein the additional layer is an adhesive layer.

Embodiment 25 is the anti-icing stack of any one of Embodiments 22 to 24, wherein the additional layer is a foam adhesive layer.

Embodiment 26 is the anti-icing stack of any one of Embodiments 22 to 23, wherein the additional layer is a foam layer.

Embodiment 27 is the anti-icing stack of Embodiment 26, further comprising an adhesive layer, the foam layer disposed between the adhesive layer and the elastomeric erosion protection layer.

Embodiment 28 is the anti-icing stack of any one of Embodiments 22 to 27, wherein the tensile modulus of the additional layer is no more than 0.5 times the tensile modulus of the erosion protection layer.

Embodiment 29 is the anti-icing stack of any one of Embodiments 22 to 28, wherein the thickness of the additional layer is greater than 2 times the thickness of the erosion protection layer.

Embodiment 30 is the anti-icing stack of any one of Embodiments 22 to 29 having a flexural modulus of less than 10 MPa.

Embodiment 31 is the anti-icing stack of Embodiment 30, wherein the flexural modulus is as determined according to ASTM test standard D790-17.

Embodiment 32 is the aerodynamic surface of any one of Embodiments 22 to 31, wherein the thickness of the additional layer is at least 600 micrometers.

Embodiment 33 is a method of reducing an ice adhesion of an erosion protection layer for an aerodynamic surface, the method comprising: disposing a first intermediate layer between the erosion protection layer and the aerodynamic surface, the first intermediate layer having a thickness greater than a thickness of the erosion protection layer, and a tensile modulus of no more than a tensile modulus of the erosion protection layer.

Embodiment 34 is the aerodynamic surface of Embodiment 33, wherein the tensile modulus of the erosion protection layer and the tensile modulus of the first intermediate layer are as determined according to ASTM test standard D882-12.

Embodiment 35 is the method of Embodiment 33 or 34, wherein the first intermediate layer has an elongation at break of greater than 100%.

Embodiment 36 is the method of any one of Embodiments 33 to 35, wherein the first intermediate layer comprises a foam adhesive.

Embodiment 37 is the method of any one of Embodiments 33 to 36, further comprising disposing a second intermediate layer between the first intermediate layer and the aerodynamic surface.

Embodiment 38 is the method of Embodiment 37, wherein the first intermediate layer comprises a foam and the second intermediate layer comprises an adhesive.

Embodiment 39 is the method of any one of Embodiments 33 to 38, further comprising disposing an anti-icing layer on the erosion protection layer opposite the first intermediate layer.

Embodiment 40 is the method of Embodiment 39, wherein the step of disposing an anti-icing layer on the erosion protection layer comprises coating and then drying an anti-icing coating composition on the erosion protection layer.

Embodiment 41 is the method of Embodiment 39 wherein the step of disposing an anti-icing layer on the erosion protection layer comprises coating and then drying an anti-icing coating composition on the erosion protection layer, the anti-icing coating composition comprising either a polysiloxane acrylate copolymer or a polyurethane dispersion, an organic thickener, a film-forming additive, and an ice-release additive.

Embodiment 42 is the method of Embodiment 40 or 41, wherein the anti-icing coating composition comprises a polyurethane dispersion, an organic thickener, a film-forming additive, and an ice-release additive.

Embodiment 43 is the method of Embodiment 41 or 42, wherein the ice-release additive comprises a polydimethyl siloxane moiety.

Embodiment 44 is the method of Embodiment 41 or 42, wherein the ice-release additive comprises at least one of a fluorinated alkyl moiety or a perfluoroether moiety.

Embodiment 45 is the method of Embodiment 41 or 42, wherein the ice-release additive comprises an amphiphilic additive.

Embodiment 46 is the method of Embodiment 40 or 41, wherein the anti-icing coating composition comprises a polysiloxane acrylate copolymer.

Embodiment 47 is the method of any one of Embodiments 33 to 46, wherein the tensile modulus of the first intermediate layer is less than 5 MPa.

Embodiment 48 is the method of any one of Embodiments 33 to 47, wherein the tensile modulus of the first intermediate layer is less than 3 MPa.

Embodiment 49 is the method of any one of Embodiments 33 to 48, wherein the first intermediate layer has a thickness of at least 600 micrometers.

Embodiment 50 is the method of any one of Embodiments 33 to 49, wherein the first intermediate layer has a thickness greater than 2 times a thickness of the erosion protection layer.

Embodiment 51 is the method of any one of Embodiments 33 to 50 being a method for reducing an ice adhesion of an erosion protection layer disposed on an edge portion of the aerodynamic surface.

Embodiment 52 is the method of any one of Embodiments 33 to 51, wherein disposing the first intermediate layer between the erosion protection layer and the aerodynamic surface comprises disposing the first intermediate layer on an edge portion of the aerodynamic surface.

Embodiment 53 is the method of any one of Embodiments 33 to 52, wherein the aerodynamic surface is a rotor blade surface.

EXAMPLES

Materials 3M 9415 is a repositionable tape having a 50 µm PET carrier and available from 3M Company (St. Paul, Minn., USA).
3M PU 8591 is a polyurthane protective film available from 3M Company (St. Paul, Minn., USA) and having a thickness of about 300 µm.
3M PU 8592 is a polyurethane protective film available from 3M Company (St. Paul, Minn., USA) and having a thickness of about 150 µm.
3M Wind Blade Protection Tape W8607 is available from 3M Company (St. Paul, Minn., USA).
3M Wind Blade Protection Coating W4600 is available from 3M Company (St. Paul, Minn., USA).
BYK-333 and BYK-378 are additives available from BYK/Altana (Germany).
DPM (dipropylene glycol monomethyl ether) is available from Sigma-Aldrich (St. Louis, Mo., USA).
FC-4430 and FC-4432 are fluorosurfactants available from 3M Company (St. Paul, Minn., USA).
MIRAPOL Surf-S 210 is a polymer additive available from Solvay S. A. (Belgium).
Neorez R-2005 is an aqueous polyurethane dispersion (35 wt % solids) available from DSM Resins, Inc. (Augusta, Ga., USA).
TEGO Phobe and TEGO Glide additives are available from Evonik Industries (Germany).
VHB GPH-060GF is an acrylic foam tape available from 3M Company (St. Paul, Minn., USA) and having a thickness of about 600 µm.
VHB GPH-110GF is an acrylic foam tape available from 3M Company (St. Paul, Minn., USA) and having a thickness of about 1100 µm.
VHB GPH-160GF is an acrylic foam tape available from 3M Company (St. Paul, Minn., USA) and having a thickness of about 1600 µm.
Xanthan is available from Sigma-Aldrich (St. Louis, Mo., USA).
Ice Release Coating IRC1 is a polysiloxane acrylate copolymer ice release coating solution prepared as follows:

A 250 ml reaction bottle was charged respectively with 5.25 g (35 w %) X-22-2426 (silicone methacrylate macromonomer available from Shin-Etsu), 9.75 g (65 w %) BMA (butyl methacrylate available from Sigma-Aldrich), 45.0 g t.BuOH (t.butanol available from Sigma-Aldrich) and 0.045 g V-59 (2,2'-azobis(2-methylbutyronitrile) initiator available from Wako). The bottle was degassed with waterjet vacuum, followed by breaking the vacuum with nitrogen atmosphere. This procedure was repeated 3 times. The reaction bottle was sealed and run for 4 hours in a preheated Launder-O-meter at 70° C. After cooling 0.045 g V-59 was added, the bottle was again degassed and covered with nitrogen atmosphere. The reaction bottle was then run for another 16 hours at 70° C., yielding a clear, colorless semi-viscous solution containing 25% polymer solids.

Examples 1-9

Coating compositions were prepared as indicated in Table 1 in a solvent of deionized water (DIW) and DPM in an 85:15 ratio by weight. The coating compositions were prepared on a 50 g scale. The corresponding amounts of materials were mixed in a glass jar, equipped with a magnetic stirrer in the following order: 1. DIW/DPM, 2. Neorez R-2005, 3. Xanthan, 4. Amphiphilic additive. After addition of Xanthan, the mixture was allowed to stir for about 1 hour to ensure a homogeneous mixture. An W8607 tape was laminated onto a glass test plate (5×15 cm, obtained from Rocholl GmbH, Germany) and coated with a #10 Meyer Bar (wet coating thickness: 23 µm) and allowed to dry for 48 hours at room temperature before testing. The coatings were evaluated for wetting and coating appearance.

TABLE 1

| Coat. No. | Total wt % | R-2005 (wt %) | Xanthan (wt %) | Additive (Type, wt %) | Wetting | Coating Appearance |
|---|---|---|---|---|---|---|
| 1 | 10 | 10 | — | — | Poor | Poor |
| 2 | 10 | 9.42 | 0.08 | — | Medium | Good |
| 3 | 10 | 9.42 | 0.08 | TEGO Glide 482, 0.5 | Good | Slight defects |
| 4 | 10 | 9.42 | 0.08 | TEGO Glide 100, 0.5 | Good | Good |
| 5 | 10 | 9.42 | 0.08 | TEGO Glide 410, 0.5 | Good | Good |
| 6 | 10 | 9.42 | 0.08 | TEGO Glide 440, 0.5 | Good | Slight defects |
| 7 | 10 | 9.42 | 0.08 | 3M FC-4430, 0.5 | Good | Good |
| 8 | 10 | 9.42 | 0.08 | 3M FC-4432, 0.5 | Good | Good |
| 9 | 10 | 9.42 | 0.08 | BYK-333, 0.5 | Good | Good |
| 10 | 10 | 9.42 | 0.08 | BYK-378, 0.5 | Good | Defects |
| 11 | 10 | 9.42 | 0.08 | MIRAPOL Surf-S 210, 0.5 | Good | Slight defects |

For selected formulations, which showed good wetting and coating appearance after coating on W8607, additional tests were performed. The results of theses tests are provided in Table 2.

The coatings were visually inspected for coating homogeneity using the following scale: 5: homogeneous, 4: few local defects, 3: even distribution of slight defects, 2: even distribution of high number of defects, 1: even distribution of significant number of defects.

The coatings were visually inspected for transparency using the following scale: good (fully transparent, no change in transparency compared to untreated film), medium (slightly hazy), poor (strongly hazy, significant change in transparency compared to untreated film).

A droplet test was carried out by placing an 0.5 mL droplet of water on the coated surface. The droplet was covered with a cup to avoid evaporation and stored at room temperature. After 2 hours, the cup was removed and the drop was removed by soaking with a tissue. The surface was then visually inspected and rated from 5 (no change in coating appearance, such as swelling, appearance, mechanics) to 1 (significant changes).

Ice-column tests were carried out as follows. A plastic cuvette was modified by drilling a hole of about 4 mm square close to the bottom. The modified cuvette was placed upside down on a coated test plate and fixed with two rubber rings. After that, the construction was cooled to −40° C. for 30 min in a freezer. The cuvette was then filled with a suitable amount of cold (about 8° C.) deionized water, followed by cooling the construction overnight in a freezer (−40° C.). On the next day, the rubber rings were removed and the test specimen was placed in a Zwick tensile tester with a cooling chamber (−10° C.) and the force to remove the ice column was measured. An average of 5 independent measurements are reported in Table 2.

TABLE 2

| Coat. No. | Additive | Transparency | Homogeneity | Droplet Test | ICT (kPa) |
|---|---|---|---|---|---|
| 2 | none | good | 4 | — | 342 ± 32 |
| 7 | FC-4430 | good | 5 | 5 | 211 ± 23 |
| 8 | FC-4432 | good | 4 | 5 | 179 ± 31 |
| 9 | BYK-333 | good | 4 | 3 | 269 ± 33 |
| Uncoated W8607 | — | — | — | — | 684 ± 119 |

Anti-icing stacks can be made by applying coatings 3-11 onto an erosion protection layer disposed on a foam layer, for example. Examples 1-9 are anti-icing stacks prepared by coating W8607 tapes with coating numbers 3-11, respectively, and laminating each of the coated tapes to a foam layer such as a foam adhesive layer. Suitable foam adhesive layers are provided, for example, by 3M VHB 4433, 3M VHB 4611, 3M VHB 5952, 3M VHB GPH-060GF, 3M VHB GPH-110GF, and 3M VHB GPH-160GF acrylic foam tapes available from 3M Company (St. Paul, Minn., USA).

Example 10

An erosion protection coating (3M Wind Blade Protection Coating W4600) was applied to a substrate which was then adhered to a leading edge of an aerodynamic surface using a foam adhesive. The substrate was included for ease of coating. To illustrate the improvement that can be achieved from using a soft layer between the erosion protection layer and the aerodynamic surface, the substrate was selected to be either a rigid (0.5 mm thick) aluminum substrate (Test Specimen 1) or a flexible (0.03 mm thick) aluminum substrate (Test Specimen 2). A 300 µm W4600 layer was applied by knife coating on each aluminum substrate at 23° C. and 50% relative humidity (r.h.). After an 8 h curing interval at 23° C. and 50% r.h. the sheets were further applied to an approximately 1 mm double-sided acrylic foam tape and allowed to fully cure for another 3 days.

The ice-release properties of the multilayer constructions were tested using an Adverse Environment Rotor Test Stand (AERTS) which included two rotor blades attached to a motor in a test chamber. Test specimens were applied to an aerodynamic profile located at the rotor blade tip and the environment was conditioned to a specified temperature (−8° C. or −12° C.). At a tip speed of 70 m/s, water droplets with an MVD (median droplet diameter) of 20 µm were sprayed into the test chamber forcing ice build-up on the test profile leading edge. When the centrifugal force of the ice build-up exceeds the ice-release force an anti-icing event occurs. This allowed an ice adhesion strength to be determined. Three measurements were taken for each of the two rotor blade arms and an average and standard deviation of the ice adhesion strength were determined.

For Test Specimen 1, the release forces at −12° C. were too high to measure. At −8° C., the average ice adhesion strength for Test Specimen 1 was 18.3 psi and the standard deviation was 3.7 psi.

At −12° C. the average ice adhesion strength for Test Specimen 2 was 12.9 psi and the standard deviation was 3.7 psi. At −8° C., the average ice adhesion strength for Test Specimen 2 was 3.8 psi and the standard deviation was 1.9 psi.

Examples 11-21 and Comparative Examples C1-C2

An erosion protection layer was applied to a substrate, as indicated in Table 3. In some cases (as indicated Table 3), the IRC1 ice release coating was applied to the erosion protection layer using a #10 Meyer Bar (wet coating thickness: 23 µm) and allowed to dry at room temperature for 48 hours. The 3M PU 8591 layers were applied without including a PSA layer and the W4600 coating was applied at a 300 µm thickness. Coatings were allowed to fully cure before further testing.

Ice-column tests were carried out as described for Examples 1-9. Four measurements were taken for each sample and an average of the ice release force was determined and is reported in Table 3.

TABLE 3

| Example | Substrate | Erosion Protection Layer | Ice Release Coating | Ice Release Force (N/cm$^2$) |
|---|---|---|---|---|
| 11 | VHB GPH-060GF (600 µm) | 3M PU 8591 (300 µm) | — | 40 |
| 12 | VHB GPH-110GF (1100 µm) | 3M PU 8591 (300 µm) | — | 28 |
| 13 | VHB GPH-160GF (1600 µm) | 3M PU 8591 (300 µm) | — | 28 |
| 14 | VHB GPH-060GF (600 µm) | 3M PU 8592 (150 µm) | — | 41 |
| 15 | VHB GPH-110GF (1100 µm) | 3M PU 8592 (150 µm) | — | 18 |
| 16 | VHB GPH-160GF (1600 µm) | 3M PU 8592 (150 µm) | — | 22 |
| 17 | VHB GPH-060GF (600 µm) | 3M PU 8591 (300 µm) | IRC1 | 12 |
| 18 | VHB GPH-110GF (1100 µm) | 3M PU 8591 (300 µm) | IRC1 | 11 |
| 19 | VHB GPH-160GF (1600 µm) | 3M PU 8591 (300 µm) | IRC1 | 9 |
| 20 | VHB GPH-110GF (1100 µm) | W4600 (300 µm) | — | 31 |
| C1 | 3M 9415 (50 µm) | W4600 (300 µm) | — | 78 |
| 21 | VHB GPH-110GF (1100 µm) | W4600 (300 µm) | IRC1 | 8 |
| C2 | 3M 9415 (50 µm) | W4600 (300 µm) | IRC1 | 11 |

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A wind turbine comprising:
an aerodynamic surface comprising an edge portion and
a flat anti-icing stack disposed on the edge portion, wherein the flat anti-icing stack comprises:
a first layer, a second layer and an additional layer, wherein the first layer is disposed between the second layer and the additional layer, wherein:
the first layer comprises an elastomeric erosion protection layer having an elongation at break as determined according to ASTM test standard D882-12 of greater than 100%, wherein the first layer has a uniform thickness;
the additional layer comprises a foam adhesive layer having a tensile modulus as determined according to ASTM test standard D882-12 of less than 5 MPa, the foam adhesive layer bonding the first layer to the edge portion of the aerodynamic surface, the foam adhesive layer having a thickness of at least 600 micrometers, wherein the thickness of the foam adhesive layer is at least 50% of a total thickness of the anti-icing stack,
wherein the additional layer has a uniform thickness;
the second layer comprises an anti-icing layer;
wherein the first layer comprises a polyurethane-based elastomer, and the second layer comprises either a polysiloxane acrylate copolymer or a polyurethane, an organic thickener, and an ice-release additive; and
wherein the thickness of the additional layer is greater than 2 times the thickness of the first layer.

2. The wind turbine of claim 1, wherein the tensile modulus of the additional layer is no more than 0.5 times the tensile modulus of the first erosion protection layer.

3. The wind turbine of claim 1, wherein the flat anti-icing stack has a flexural modulus of less than 10 MPa.

* * * * *